US008816880B1

(12) United States Patent
Foster

(10) Patent No.: US 8,816,880 B1
(45) Date of Patent: Aug. 26, 2014

(54) SYSTEMS AND METHODS FOR PROVIDING NAVIGATIONAL ASSISTANCE TO A PARKING FACILITY

(71) Applicant: Google Inc., Mountain View, CA (US)

(72) Inventor: Andrew Foster, Sydney (AU)

(73) Assignee: Google Inc., Mountain View, CA (US)

( * ) Notice: Subject to any disclaimer, the term of this patent is extended or adjusted under 35 U.S.C. 154(b) by 15 days.

(21) Appl. No.: 13/755,196

(22) Filed: Jan. 31, 2013

Related U.S. Application Data

(60) Provisional application No. 61/592,727, filed on Jan. 31, 2012.

(51) Int. Cl.
*B60Q 1/48* (2006.01)
*G08G 1/14* (2006.01)

(52) U.S. Cl.
USPC ........ 340/932.2; 340/988; 340/990; 340/994; 340/995.1

(58) Field of Classification Search
USPC .................... 340/932.2, 988, 990, 994, 995.1
See application file for complete search history.

(56) References Cited

U.S. PATENT DOCUMENTS 7,949,464 B2 5/2011 Kaplan et al.
2004/0068433 A1 4/2004 Chatterjee et al.
2005/0280555 A1 12/2005 Warner, IV
2006/0077055 A1 4/2006 Basir
2007/0061192 A1 3/2007 Chew
2009/0187342 A1 7/2009 Vavrus et al.
2010/0161207 A1 6/2010 Do
2010/0198626 A1 8/2010 Cho et al.
2010/0228473 A1 9/2010 Ranford
2010/0302068 A1* 12/2010 Bandukwala .............. 340/932.2
2011/0022427 A1 1/2011 Dayan
2011/0060653 A1 3/2011 King et al.
2011/0062230 A1 3/2011 Ward, II et al.

(Continued)

FOREIGN PATENT DOCUMENTS

AU 2003248283 B2 10/2003
DE 10019649 A1 11/2001

(Continued)

OTHER PUBLICATIONS

Yan, Gongiun, et al.,"Smart Parking: A Secure & Intelligent Parking System", IEEE Intelligent Transportation Systems Magazine, Spring 2011, pp. 18-30.

(Continued)

*Primary Examiner* — Travis Hunnings
(74) *Attorney, Agent, or Firm* — Bracewell & Giuliani LLP

(57) ABSTRACT

A computer-implemented method that includes receiving a request for navigational assistance to a location, identifying a parking facility at or near the location, identifying a first section of the parking facility having parking availability, identifying a first entrance of the parking facility that corresponds to the first section of the parking facility, providing, via a mobile communications device, navigational assistance to the first entrance of the parking facility, monitoring parking availability at the parking facility, and, prior to receiving an indication that a vehicle associated with the mobile communications device has arrived at the first entrance of the parking facility, determining that a second section of the parking facility currently has a parking availability that exceeds the parking availability of the first section of the parking facility, and providing navigational assistance to a second entrance of the parking facility that corresponds to the second section of the parking facility.

20 Claims, 6 Drawing Sheets

(56) References Cited

U.S. PATENT DOCUMENTS

| | | | | |
|---|---|---|---|---|
| 2011/0106426 | A1* | 5/2011 | Tertoolen | 701/201 |
| 2011/0131154 | A1 | 6/2011 | Faber et al. | |
| 2011/0140922 | A1* | 6/2011 | Levy et al. | 340/932.2 |
| 2011/0143779 | A1 | 6/2011 | Rowe et al. | |
| 2011/0153190 | A1* | 6/2011 | Rolinski et al. | 701/201 |
| 2011/0178703 | A1* | 7/2011 | Aben et al. | 701/207 |
| 2011/0225068 | A1 | 9/2011 | Figueroa et al. | |

FOREIGN PATENT DOCUMENTS

| | | | |
|---|---|---|---|
| DE | 10 2004 028491 | B4 | 5/2006 |
| JP | 2002298175 | A | 10/2002 |
| JP | 2005011235 | A | 1/2005 |
| JP | 2007285734 | A | 11/2007 |
| JP | 2008146652 | A | 6/2008 |
| JP | 2009058492 | A | 3/2009 |
| KR | 2010057438 | A | 5/2010 |
| NL | 1014109 | C2 | 4/2002 |
| WO | 0141029 | A1 | 6/2001 |
| WO | 2006106369 | A1 | 10/2006 |

OTHER PUBLICATIONS

Crowder, Michelle, et al., "Developing an Intelligent Parking Systems for the University of Texas at Austin", May 2003, Southwest Regional University Transportation Center, pp. 1-59.

Wang, Hongwei, et al., "A Reservation-Based Smart Parking System", The First International Workshop on Cyber-Physical Networking Systems—IEEE, 2011, pp. 690-695.

Koralalage, Krishan Sabaragam, et al., "iPark: A Universal Solution for Vehicle Parking", WSKS, 2009, Springer-Verlag Berlin Heidelberg, pp. 594-604.

Khang, Soh Chun, et al., "Wireless Mobile-Based Shopping Mall Car Parking System (WMCPS)", IEEE Asia-Pacific Services Computing Conference, 2010, pp. 573-577.

Copending U.S. Appl. No. 13/407,142, entitled "Systems and Methods for Providing Alerts Regarding Expiration of Authorized Parking," by Andrew Foster, filed Feb. 28, 2012.

Copending U.S. Appl. No. 13/407,122, entitled "Systems and Methods for Providing Navigational Assistance to Reserved Parking Locations," by Sashanka Vishnuvajhala, filed Feb. 28, 2012.

* cited by examiner

400'

402 404 406 408

| SECTION | PARK. AVAIL. % | # SPACES OCC. | # SPACES | ENTRANCE(S) |
|---|---|---|---|---|
| 1 | 35% | 30 | 46 | E1 |
| 2 | 13% | 40 | 46 | E2,E3 |
| 3 | 57% | 20 | 46 | E4,E5 |
| 4 | 46% | 25 | 46 | E5 |

*FIG. 4A*

400"

402 404 406 408

| SECTION | PARK. AVAIL. % | # SPACES OCC. | # SPACES | ENTRANCE(S) |
|---|---|---|---|---|
| 1 | 45% | 25 | 46 | E1 |
| 2 | 20% | 37 | 46 | E2,E3 |
| 3 | 40% | 28 | 46 | E4,E5 |
| 4 | 40% | 28 | 46 | E5 |

*FIG. 4B*

SYSTEMS AND METHODS FOR PROVIDING NAVIGATIONAL ASSISTANCE TO A PARKING FACILITY

RELATED APPLICATIONS

This application claims the benefit of U.S. Provisional Patent Application No. 61/592,727 filed Jan. 31, 2012, entitled "SYSTEMS AND METHODS FOR PROVIDING NAVIGATIONAL ASSISTANCE TO A PARKING FACILITY".

BACKGROUND OF THE INVENTION

1. Field of the Invention

This invention relates generally to providing assistance in locating available parking and more particularly to providing navigational assistance to a parking facility.

2. Description of the Related Art

When traveling to a destination via a vehicle, users often desire to park their vehicle at or near the destination. For example, when arriving at a shopping mall, a driver typically desires to park their vehicle in a parking facility (e.g., a parking lot) that is at or near the shopping mall. Unfortunately, parking facilities are often crowded with a large number of vehicles, making it difficult for users to find a suitable parking space. As a result, users often have to drive through various portions of a parking facility to locate a suitable parking space. For example, a user may have to circle through a parking facility several times or more to find an unoccupied parking space. The search for a parking space can result in an expenditure of the user's time, increased fuel consumption and general frustration of the user.

In attempt to assist users with finding a suitable location for parking, systems have been developed that attempt to monitor the status of available parking. Unfortunately, these systems may provide static parking information that may not accurately reflect continuous changes in parking availability. As a result, a user may not have an opportunity to make an informed decision as to whether or not they will continue to travel to their destination in view of changing parking conditions. Moreover, although some systems provide navigational assistance to locations of parking facilities, these systems do not provide for directing users to parking facility entrances that provide convenient access to available parking

SUMMARY OF THE INVENTION

Various embodiments of methods and apparatus for providing navigational assistance to a parking facility are provided herein. In some embodiments, provided is a computer-implemented method that includes receiving, from a mobile communications device, a request for navigational assistance to a given location, identifying a parking facility at or near the given location, the parking facility including a plurality of sections accessible via a plurality of different entrances to the parking facility, and each of the sections including a corresponding set of parking spaces, identifying a first section of the parking facility associated with a level of parking availability that exceeds levels of parking availability of others of the plurality of sections of the parking facility, identifying a first entrance of the parking facility that corresponds to the first section of the parking facility, providing, to the mobile communications device for presentation to a user, navigational assistance to the first entrance of the parking facility, and prior to receiving an indication that a vehicle associated with the mobile communications device has arrived at the first entrance of the parking facility, monitoring, using a computer, current availability of parking in the plurality of sections of the parking facility to determine whether the first section continues to be associated with a level of parking availability that exceeds levels of parking availability associated with the others of the plurality of sections of the parking facility, determining that a second section of the parking facility is associated with a current level of parking availability that exceeds a current level of parking availability associated with the first section of the parking facility, and in response to determining that the second section of the parking facility is associated with a current level of parking availability that exceeds a current level of parking availability associated with the first section of the parking facility, providing, to the mobile communications device for presentation to the user, navigational assistance to a second entrance of the parking facility that corresponds to the second section of the parking facility.

In some embodiments, provided is a non-transitory computer readable storage medium having computer-executable program instructions stored thereon that are executable by a computer to cause steps including receiving, from a mobile communications device, a request for navigational assistance to a given location, identifying a parking facility at or near the given location, the parking facility including a plurality of sections accessible via a plurality of different entrances to the parking facility, and each of the sections including a corresponding set of parking spaces, identifying a first section of the parking facility associated with a level of parking availability that exceeds levels of parking availability of others of the plurality of sections of the parking facility, identifying a first entrance of the parking facility that corresponds to the first section of the parking facility, providing, to the mobile communications device for presentation to a user, navigational assistance to the first entrance of the parking facility, and prior to receiving an indication that a vehicle associated with the mobile communications device has arrived at the first entrance of the parking facility: monitoring, using a computer, current availability of parking in the plurality of sections of the parking facility to determine whether the first section continues to be associated with a level of parking availability that exceeds levels of parking availability associated with the others of the plurality of sections of the parking facility, determining that a second section of the parking facility is associated with a current level of parking availability that exceeds a current level of parking availability associated with the first section of the parking facility, and in response to determining that the second section of the parking facility is associated with a current level of parking availability that exceeds a current level of parking availability associated with the first section of the parking facility, providing, to the mobile communications device for presentation to the user, navigational assistance to a second entrance of the parking facility that corresponds to the second section of the parking facility.

In some embodiments, provided is a system including a processor, a memory and a map module stored on the memory. The map module is configured to be executed by the processor to cause receiving, from a mobile communications device, a request for navigational assistance to a given location, identifying a parking facility at or near the given location, the parking facility including a plurality of sections accessible via a plurality of different entrances to the parking facility, and each of the sections including a corresponding set of parking spaces, identifying a first section of the parking facility associated with a level of parking availability that exceeds levels of parking availability of others of the plurality of sections of the parking facility, identifying a first entrance of the parking facility that corresponds to the first section of the parking facility, providing, to the mobile communications device for presentation to a user, navigational assistance to the first entrance of the parking facility, and prior to receiving an indication that a vehicle associated with the mobile communications device has arrived at the first entrance of the parking facility: monitoring, using a computer, current availability of parking in the plurality of sections of the parking facility to determine whether the first section continues to be associated with a level of parking availability that exceeds levels of parking availability associated with the others of the plurality of sections of the parking facility, determining that a second section of the parking facility is associated with a current level of parking availability that exceeds a current level of parking availability associated with the first section of the parking facility, and in response to determining that the second section of the parking facility is associated with a current level of parking availability that exceeds a current level of parking availability associated with the first section of the parking facility, providing, to the mobile communications device for presentation to the user, navigational assistance to a second entrance of the parking facility that corresponds to the second section of the parking facility.

In some embodiments, provided is a method for providing navigational assistance to a section of a parking facility determined to have the most suitable parking availability. The method includes receiving, from a mobile communications device, a request for navigational assistance to a given location, identifying a parking facility at or near the given location, the parking facility including a plurality of sections accessible by a plurality of different entrances to the parking facility, each of the sections including a plurality of parking spaces, identifying a first section of the parking facility having a most suitable parking availability, identifying an entrance of the parking facility that corresponds to the first section of the parking facility identified as having the most suitable parking availability, providing, to the mobile communications device, navigational assistance to direct a vehicle to the entrance of the parking facility, substantially continuously monitoring availability of parking in the plurality of sections of the parking facility to determine whether another section of the parking facility has parking availability that is more suitable than the section of the parking facility identified as having the most suitable parking availability, and in response to determining that another section of the parking facility has parking availability that is more suitable than the section of the parking facility identified as having the most suitable parking availability, rerouting the navigational assistance to direct a vehicle to an entrance of the parking facility that corresponds to the other section of the parking facility.

BRIEF DESCRIPTION OF THE DRAWINGS

FIGS. 4A and 4B are tables that illustrate exemplary parking status listings in accordance with one or more embodiments of the present technique.

DETAILED DESCRIPTION OF THE PREFERRED EMBODIMENTS

Figure 1:
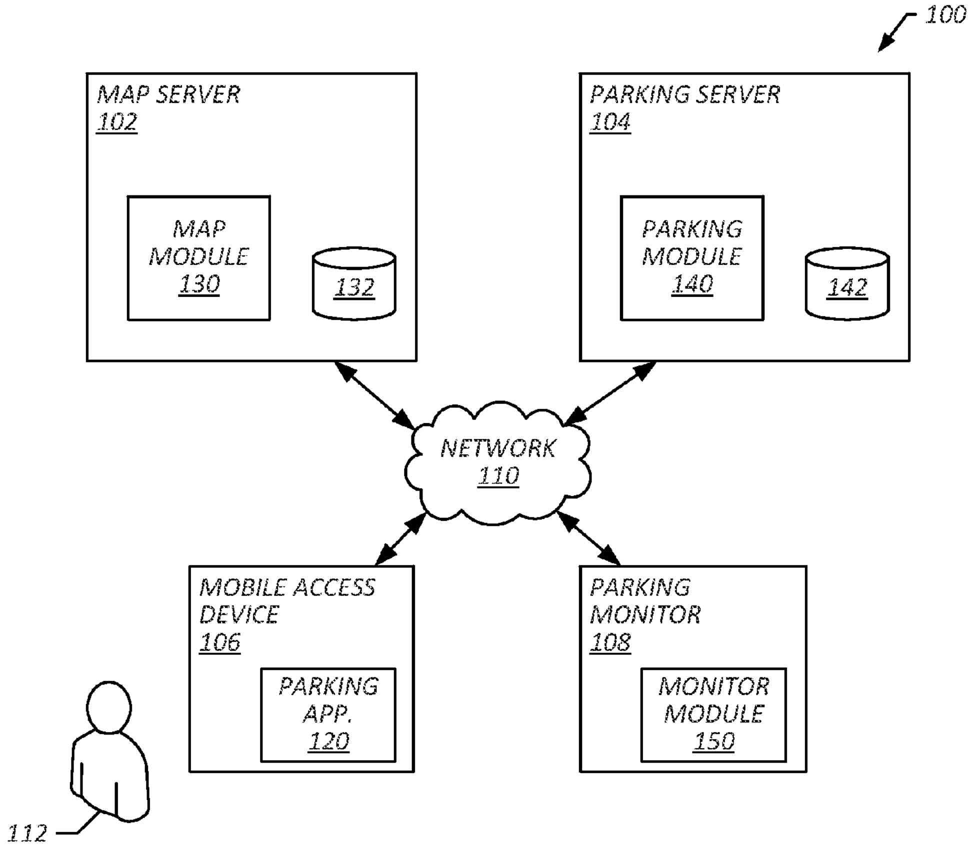
FIG. 1 is a diagram that illustrates an exemplary parking assistance system in accordance with one or more embodiments of the present technique.

As discussed in more detail below, provided in some embodiments are systems and methods for providing navigational assistance for directing users to a parking facility. In some embodiments, a parking facility may include location for parking vehicles that is accessible from a plurality of different entrances. In certain embodiments, the parking facility may include a plurality of parking sections including a grouping of one or parking spaces that are associated with one or more of the plurality of different entrances to the parking facility. In some embodiments, a given parking section may be associated with one or more entrances that provide convenient access to the given parking section.

In some embodiments, a user may submit a request for navigational assistance to a destination, for example via a mobile communications device such as a navigation unit (e.g., a portable navigation device or an in-vehicle navigation device), a cellular phone, a personal digital assistant (PDA) or the like. In certain embodiments, a parking system may identify a parking facility at or near the destination. In some embodiments, the parking system may identify a first section of the parking facility that has the most suitable parking availability (e.g., the highest level of available parking) at or near a time of the request. In certain embodiments, the parking system may identify a first entrance of the parking facility that is associated with the first section of the parking facility (e.g., a corresponding entrance that provides convenient access to the first section). In some embodiments, the parking system may return navigational assistance to direct the user to the parking facility. In certain embodiments, navigational assistance may include a geographic mapping for providing navigational assistance to the first entrance of the parking facility identified as being associated with the first section of the parking facility having the most suitable parking availability. In certain embodiments, the geographic mapping may be displayed to the user via a graphical user interface (e.g., a display) of the mobile communications device. In some embodiments, navigational assistance to the first entrance of the parking facility may include route information (e.g., a route displayed on the geographic mapping) for directing the user from a given location (e.g., the current location of the mobile communications device) to the first entrance of the parking facility.

In certain embodiments, the parking system may continuously monitor current levels of parking availability of the plurality of sections of the parking facility to determine whether the first parking section continues to have the most suitable parking availability relative to the other parking sections of the parking facility. In some embodiments, where it is determined that the first section continues to have the most suitable parking availability relative to the other parking sections of the parking facility, navigational assistance to the first entrance may continue to be provided. In certain embodiments, where it is determined that another section (e.g., a second section of the parking facility) has the most suitable parking (e.g., that the first section no longer has the most suitable parking availability relative to the other parking sections of the parking facility), the parking system may identify a second entrance of the parking facility that is associated with a second section of the parking facility identified as currently having the most suitable parking availability, and may provide navigational assistance to the second entrance. In some embodiments, the parking system may dynamically update a route displayed on the geographic mapping to direct the user from a given location (e.g., the current location of the mobile communications device) to the second entrance of the parking facility. In certain embodiments, the user may be alerted to a change in the routing. In some embodiments, the change in routing may occur without any substantial notification to the user such that the route may be continuously updated without providing any substantial distractions to the user.

In some embodiments, the parking system may enable a user to request navigational assistance to a given destination, provide navigational assistance to an entrance of a parking facility at the destination that provides convenient access to a parking section that has the most suitable parking availability at or near the time of the request for navigational assistance, continuously monitor the parking availability of the parking facility prior to the arrival of the user to the parking facility (e.g., while the user is traveling to the parking facility) and, in response to determining that another section has the most suitable parking availability, dynamically reroute the user to an entrance of the other section. In some embodiments, the parking system may continue to monitor the parking availability of the sections of the parking facility as the user navigates to the parking facility, and may provide dynamically updated navigational assistance to an entrance of a section determined to currently have (or being expected to have) the most suitable parking availability for a vehicle associated with the mobile communications device.

FIG. 1 is a diagram that illustrates an exemplary parking assistance system ("system") 100 in accordance with one or more embodiments of the present technique. As depicted, system 100 may include a map server 102, a parking server 104, an access device 106, and a parking monitor 108. Entities of system 100 may be communicatively coupled via a network 110.

Network 110 may include any element or system that facilitates communications between the entities of system 100. For example, network 110 may facilitate communication between map server 102, parking server 104, access device 106 and/or parking monitor 108. Network 110 may include an electronic communication network, such as the Internet, a local area network (LAN), a wide area (WAN), a cellular communications network or the like. Network 110 may facilitate data exchange by way of packet switching using the Internet Protocol (IP). Network 110 may facilitate wired and/or wireless connectivity and communication. Network 110 may include a single network or combination of networks that facilitate communication between the entities of system 100.

Access device 106 may be capable of transmitting and/or receiving information via network 110. Access device 106 may be employed by a user 112 to interact with other entities coupled to network 110. Access device 106 may include one or more of a personal computer (e.g., a desktop computer), a mobile computing device (e.g., a laptop or tablet computer), a cellular communication device (e.g., a cellular phone), a personal digital assistant (PDA), a media player/recorder, a game console, a television system, an audio system, a radio system, a navigation system, or the like. Access device 106 may include a mobile communications device capable of being coupled to network 110 via a cellular communications network or similar wireless network. For example, access device 106 may include a portable navigation device, an in-vehicle navigation device, a cellular phone, a personal digital assistant (PDA), a laptop computer, a tablet computer, or similar mobile computing device capable of wireless and/or wired communication with parking server 102 via network 110.

Access device 106 may include various input/output (I/O) interfaces such as a graphical user interface (e.g., display screen), an audible output user interface (e.g., speaker), a keyboard, a pointer device (e.g., mouse, trackball, touchpad, stylus or the like), an audible input user interface (e.g., microphone), a printer, or the like. In some embodiments, access device 106 may include a computer system similar to that of computer system 1000 described below with regard to at least FIG. 7.

Access device 106 may include general computing components and/or embedded systems optimized with specific components for performing specific tasks. Access device 106 may include a program/application that can be used to generate a request for content, to provide content, to render content, and/or to send/receive request to other devices via network 110. For example, access device 106 may employ a parking application 120. Parking application 120 may be implemented via an Internet web-browser application, a standalone parking assistance application, or similar application executed on access device 106. In some embodiments, parking application 120 may include a general purpose mapping and/or navigation application that provides navigational assistance (e.g., a route displayed on a map) to a selected destination (e.g., a business address). As discussed herein, in some embodiments, as a result of a user requesting navigation to a destination via parking application 120, it may be determined whether or not a parking facility located at or near the destination has available parking, and, as a result of identifying a parking facility located at or near the destination that has available parking, parking application 120 may provide the user with navigational assistance to the an entrance of the parking facility that provides convenient access to the available parking. For example, where user 112 requests. via parking application 120, navigational assistance to a store and it is determined that a parking facility near the store has available parking, parking application 120 may display, via mobile access device 106, a map including a route for directing user 112 from their current location to a given entrance of the parking facility that provides convenient access to the available parking within the parking facility. In some embodiments, application 120 may include a module including program instructions that are executable by a computer system to perform some or all of the functionality described herein with regard to access device 106. Application 120 may be used to transmit and/or receive data and/or content via network 110, process data, render data/content for display via a graphical user interface of access device 106, and/or enable user interaction with data and/or content via a user interface of access device 106.

Map server 102 may include a server or similar device/system for processing and/or serving client requests for geographic maps, parking assistance, and/or related data. In some embodiments, map server 102 may include a computer system similar to that of computer system 1000 described below with regard to at least FIG. 7. Although map server 102 is represented by a single box, map server 102 may include a single server or similar system, or a plurality of servers and/or similar systems. For example, map server 102 may include a plurality of different servers and/or similar systems that may be employed individually or in combination to perform some or all of the functionality described herein with regard to map server 102. In some embodiments, a plurality of servers and/or similar systems may be employed in combination to provide load balanced processing (e.g., distributing processing tasks between the plurality of servers and/or similar systems).

In some embodiments, map server 102 may include map module 130. Map module 130 may include program instructions that are executable by a computer system to perform at least some or all of the functionality described herein with regard to at least map server 102. In some embodiments, map module 130 may provide for processing and serving request for maps and related data. For example, map module 102 may include an application or similar processing environment that provides for serving, to access devices 106, navigational assistance to an entrance of a parking facility that corresponds to a section of a parking facility determined to have suitable parking availability.

In some embodiments, map server 102 may include or otherwise have access to a datastore 132. Datastore 132 may include a database and/or other memory locations for storing data. In some embodiments, map module 130 may be stored on datastore 132. In some embodiments, data used for processing and/or serving requests, such as maps, parking status listings, and/or the like, may be stored on datastore 132.

Parking server 104 may include a server or similar device/system for processing and/or serving client requests for parking information and/or related data. In some embodiments, parking server 104 may include a computer system similar to that of computer system 1000 described below with regard to at least FIG. 7. Although parking server 104 is represented by a single box, parking server 104 may include a single server or similar system, or a plurality of servers and/or similar systems. For example, parking server 104 may include a plurality of different servers and/or similar systems that may be employed individually or in combination to perform some or all of the functionality described herein with regard to parking server 104. In some embodiments, a plurality of servers and/or similar systems may be employed in combination to provide load balanced processing (e.g., distributing processing tasks between the plurality of servers and/or similar systems).

In some embodiments, parking server 104 may include parking module 140. Parking module 140 may include program instructions that are executable by a computer system to perform at least some or all of the functionality described herein with regard to at least parking server 104. In some embodiments, parking module 140 may provide for processing and serving requests for parking availability information and related data. For example, parking module 104 may include an application or similar processing environment that provides for collecting and/or processing of parking availability information, and/or serving parking availability information to map server 102.

In some embodiments, parking server 104 may include or otherwise have access to a datastore 142. Datastore 142 may include a database and/or other memory locations for storing data. In some embodiments, parking module 140 may be stored on datastore 142. In some embodiments, data used for processing and/or serving request, such as parking status listings, parking status updates, and/or the like, may be stored on datastore 142.

Parking monitor 108 may include a system that provides for monitoring parking availability at one or more parking facilities. In some embodiments, parking monitor 108 may provide parking status updates to parking server 104 that are indicative of availability of one or more parking spaces within a parking facility. In some embodiments, parking monitor 108 may include one or more sensors for detecting parking availability status of one or more parking spaces and/or sections of a parking facility. For example, parking monitor 108 may include a plurality of sensors that detect whether parking spaces of the parking facility are occupied or unoccupied, and/or may provide, to parking server 104, a corresponding parking status update indicative of the status of the parking spaces. In some embodiments, a sensor may include a proximity sensor, image sensor, and/or the like for detecting the presence of vehicles in parking spaces of the parking facility. A sensor monitoring a parking space may report that a space is occupied when the sensor detects a vehicle physically parked in the parking space, and/or may report that a space is unoccupied when the sensor does not detect a vehicle physically parked in the parking space. In some embodiments, sensors may be provided at some, substantially all, or all of the parking spaces of a parking facility such that parking monitor 108 is capable of providing status information for some, substantially all, or all of the parking spaces of the parking facility. Parking monitor 108 may include a computer system similar to that of computer system 1000 described below with regard to at least FIG. 7.

In some embodiments, parking monitor 108 may include monitor module 150. Monitor module 150 may include program instructions that are executable by a computer system to perform at least some or all of the functionality described herein with regard to at least parking monitor 108. In some embodiments, monitor module 150 may provide for processing and/or serving request for parking status information and related data. For example, monitor module 150 may include an application or similar processing environment that provides for collecting parking status information and/or serving parking status information to parking server 104.

In some embodiments, map server 102, parking server 104, access device 106 and/or parking monitor 108 may include separate entities that are located remotely from one another on network 110. Although certain exemplary embodiments described herein refer to certain processes being performed on a given device/system (e.g., map server 102, parking server 104, access device 106 and/or parking monitor 108), embodiments may include the described techniques being performed by any suitable entity. For example, map server 102 may provide for some or all of the functionality described with regard to parking server 104.

Figure 2:
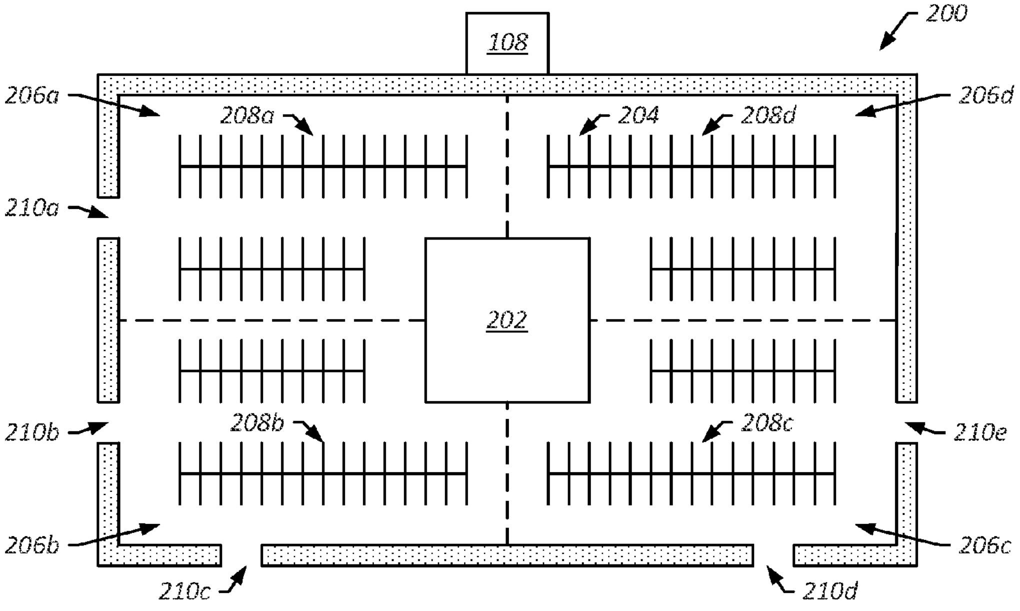
FIG. 2 is a diagram that illustrates an exemplary parking facility in accordance with one or more embodiments of the present technique.

FIG. 2 is a diagram that illustrates an exemplary parking facility 200 in accordance with one or more embodiments of the present technique. Parking facility 200 may include a parking location that surrounds a destination (e.g., a geographic place of interest) 202, such as a parking lot surrounding a shopping mall, a store, an office building, a sports complex/stadium, or the like. In some embodiments, parking facility 200 may include any number of parking spaces 204. For example, in the illustrated embodiment, parking facility 200 includes about one-hundred eighty-four individual parking spaces 204. Each parking space 204 may be suitable for the parking of a single vehicle. In some embodiments, a parking facility 200 may be sub-divided into any number of parking sections. For example, in the illustrated embodiment, parking facility 200 is divided into four parking sections 206*a*, 206*b*, 206*c* and 206*d* (collectively referred to herein as sections 206). In some embodiments, parking sections 206 may include a set of one or more parking spaces 204. For example, in the illustrated embodiment, each of parking sections 206 include respective sets of parking spaces ("parking space sets") 208*a*, 208*b*, 208*c* and 208*d* (collectively referred to herein as parking space sets 208) each having approximately forty-six parking spaces 204 located therein.

In some embodiments, parking facility 200 may be accessible via one or more entrances that provide access to parking sections 206 and parking spaces 204 of parking facility 200. For example, in the illustrated embodiment, parking facility 200 includes five entrances 210*a*, 210*b*, 210*c*, 210*d* and 210*e* (collectively referred to herein as entrances 210) providing access to parking sections 206 and parking spaces 204 of parking facility 200. In some embodiments, a given entrance 210 may provide direct access to one or more sections 206 of parking facility 200. Direct access to a given section from a given entrance may be provided where an entrance is adjacent a parking section such that a user/vehicle immediately enters the section upon entering the parking facility via the entrance. For example, entrance 210*a* provides direct access to a first section 206*a*, entrances 210*b* and 210*c* provide direct access to a second parking section 206*b*, and entrances 210*d* and 210*e* provide direct access to a third parking section 206*c*. In some embodiments, an entrance may provide indirect access to one or more parking sections of a parking facility. Indirect access to a given parking section from a given entrance may be provided where a user/vehicle must pass through at least a portion of another parking section to access the given parking section upon entering the parking facility via the given entrance. For example, entrance 210*a* may provide indirect access to a fourth section 206*d* as a user/vehicle may have to travel through at least a portion of parking section 206*a* to access fourth section 206*d* from entrance 210*a*, entrances 210*b* and 210*c* may provide indirect access to fourth section 206*d* as a user/vehicle may have to travel through at least a portion of parking section 206*b* to access fourth section 206*d* from entrances 210*b* and 210*c*, and entrances 210*d* and 210*e* may provide indirect access to fourth section 206*d* as a user/vehicle may have to travel through at least a portion of parking section 206*c* to access fourth section 206*d* from entrances 210*d* and 210*e*.

In some embodiments, a given parking section of a parking facility may be associated with one or more entrance to a parking facility. In some embodiments, a given parking section may be associated with one or more entrances that provide a convenient route for accessing the given parking section. For example, a given parking section may be associated with parking entrances that provide direct access and/or near by entrances that provide indirect access. In some embodiments, if entrances exists that provide direct access to a given parking section, the given parking section may be associated with some or all of the entrances that provide direct access to the given parking section. For example, with regard to parking facility 200, parking section 206*a* may be associated with entrance 210*a*, parking section 206*b* may be associated with entrances 210*b* and 210*c*, and parking section 206*c* may be associated with entrances 210*d* and 210*e*. In some embodiments, if no entrances exist that provides direct access to a given parking section, the given parking section may be associated with some or all of the entrances (e.g., the closest entrances) that provide indirect access to the given parking section. For example, with regard to parking facility 200, parking section 206*d* may be associated with entrance 210*e* that is closest thereto.

In some embodiments, a parking facility may include a parking monitor 108. For example, in the illustrated embodiment, parking facility 200 includes parking monitor 108. In some embodiments, parking monitor 108 may provide for monitoring a status of some, substantially all, or all of parking spaces 204 of parking facility 200. In some embodiments, parking monitor 108 may be capable of detecting the individual status of one or more of parking spaces 204. For example, parking monitor 108 may include a plurality of sensors capable of detecting whether each of parking spaces 204 is occupied or unoccupied. In some embodiments, parking monitor 108 may be capable of detecting a status of a plurality of parking spaces 204. For example, parking monitor 108 may include one or more sensors capable of detecting what percentage of parking spaces 204 of each parking space set 208 of parking section 206 are occupied or unoccupied.

In some embodiments, parking monitor 108 may provide parking status updates that are indicative of the detected status of one or more of parking spaces 204. For example, where the status of individual parking spaces 204 are monitored, upon detecting that an individual parking space “A6” has been occupied by a vehicle, parking monitor 108 may forward (e.g., to parking server 104 and/or map server 102) a parking status update indicating that parking space “A6” is occupied. As a further example, where the status of a set of parking spaces 208 is monitored, upon detecting that additional parking spaces have been occupied by vehicle such that a current percentage of the parking spaces are that are occupied is different from a previous percentage of the parking spaces are that are occupied, parking monitor 108 may forward (e.g., to parking server 104 and/or map server 102) a parking status update indicative the current percentage of parking spaces 204 in parking space set 208 of parking section 206 are occupied/unoccupied.

In some embodiments, parking monitor 108 may forward parking status updates on a substantially regular basis. For example, parking monitor 108 may forward parking status updates to parking server 104 and/or map server 102 regularly such that they may maintain an updated parking status listing. In some embodiments, parking monitor 108 may forward status updates on a periodic basis. For example, parking monitor 108 may forward parking status updates to parking server 104 and/or map server 102 about every one second, five seconds, thirty seconds, one minute, five minutes, ten minutes, or any suitable frequency. In some embodiments, parking monitor 108 may forward, to parking server 104 and/or map server 102, status updates indicative of one or more changes in parking status in response to detecting the one or more changes in parking status. For example, upon detecting that an individual parking space “A6” has been occupied by a vehicle, parking monitor 108 may forward (e.g., to parking server 104 and/or map server 102) a parking status update indicating that parking space “A6” is occupied. As a further example, where the status of parking space sets 208 is monitored, upon detecting that additional parking spaces have been occupied by vehicle such that 76% of parking spaces 204 of a given parking space set 208 are occupied, parking monitor 108 may forward (e.g., to parking server 104 and/or map server 102) a parking status update indicating that 76% of parking spaces 204 of the given parking space set 208 are occupied. In some embodiments, a parking status update may be transmitted automatically (e.g., without being requested by parking server 104 and/or map server 102). For example, parking monitor 108 may push parking status updates to parking server 104 and/or map server 102. In some embodiments, a parking status update may be transmitted in response to request for parking status updates. For example, parking monitor 108 may queue parking status updates and may transmit them to parking server 104 and/or map server 102 in response to receiving one or more corresponding queries for parking status updates. As described herein, parking status updates may be employed to determine levels of parking availability within parking facility 200.

Figure 3:
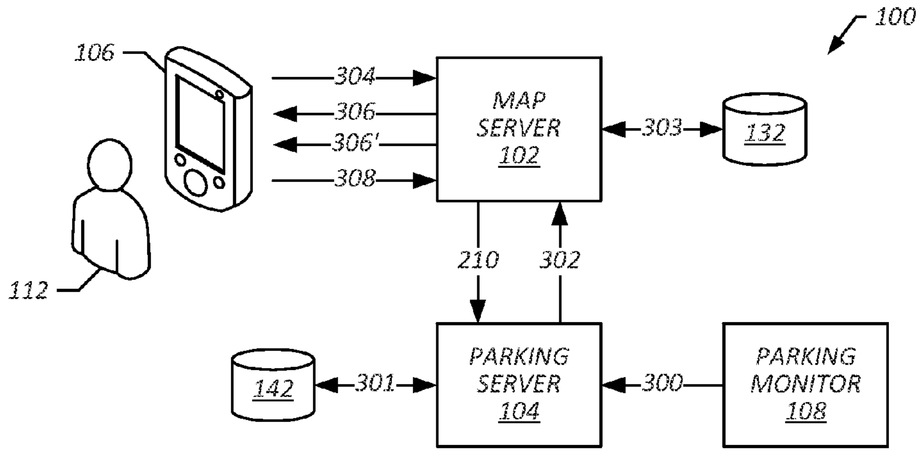
FIG. 3 is a diagram that illustrates exemplary operation of a parking system in accordance with one or more embodiments of the present technique.

FIG. 3 is a diagram that illustrates exemplary operation of parking system 100 in accordance with one or more embodiments of the present technique. In some embodiments, parking monitor 108 may collect and/or forward parking status updates to parking server 104 for a given parking facility. For example, parking monitor 108 of parking facility 200 may forward parking status updates 300 corresponding to the availability one or more parking spaces 204 and/or parking section 206 of parking facility 200 as described with regard to at least FIG. 2.

In some embodiments, parking server 104 may collect and process the received parking status updates 300 and/or other information (e.g., parking status updates received via mobile communications devices and/or map server 102 as discussed herein) to determine parking availability associated with various portions of parking facility 200. Where the status of parking spaces are tracked individually, parking server 104 may monitor parking status updates 300 received to determine a number of parking spaces 204 that are occupied/unoccupied in parking space sets 208 of parking sections 206. Where the status of groups of parking spaces are tracked cumulatively, parking server 104 may monitor the parking status updates 300 received to determine a percentage of parking spaces 204 that are occupied/unoccupied (e.g., the ratio of unoccupied/unoccupied parking spaces to the total number of spaces for the section) in parking space sets 208 of parking sections 206.

In some embodiments, parking server 104 may determine a parking availability for each section 206 of parking facility 200. For example, parking server 104 may determine that parking section 206*a* has thirty of forty-six parking spaces occupied (e.g., is about 65% full or has about 35% parking availability), that parking section 206*b* has forty of forty-six parking spaces occupied (e.g., is about 87% full or has about 13% parking availability), that parking section 206*c* has twenty of forty-six parking spaces occupied (e.g., is about 43% full or has about 57% parking availability), and that parking section 206*d* has twenty-five of forty-six parking spaces occupied (e.g., is about 54% full or has about 46% parking availability).

In some embodiments, parking server 104 may generate/maintain a parking status listing 301 indicative of parking availability some or all of parking facility 200. For example, parking status listing 301 may provide an indication of a number of parking spaces that are occupied and/or unoccupied within various sections 206 of parking facility. In some embodiments, a parking status listing 301 may be generated and/or updated based on parking status updates received and/or other parking information received (e.g., parking information received from map server 102 as described herein). For example, upon receiving a parking status update 300 indicative of a change in parking status of one or more parking spaces, parking server 104 may update parking status listing 301 to reflect the change in parking status. In some embodiments, parking server 104 may store parking status listing 301 in datastore 142 or a similarly accessible storage location.

FIG. 4A is a table that illustrates an exemplary parking status listing 400' in accordance with one or more embodiments of the present technique. Although illustrated as a table, parking status listing 400' may take any suitable format and/or may be stored in any suitable data format. In some embodiments, parking status listing 400' may be indicative of parking availability of the four parking sections 206*a*-106*d* (e.g., corresponding to respective section identifiers "1"-"4") of parking facility 200 at or near a first point in time. In some embodiments, parking status listing 400' may correspond to a version of parking status listing 301 at or near the first point in time. In some embodiments, parking status listing 400" may include an indication of a percentage of parking spaces that are occupied and/or unoccupied. For example, parking status listing 400' may include a parking availability percentage 402 indicative of a percentage of unoccupied parking spaces 204 in each corresponding parking section 206. In some embodiments, parking status listing 400' may include an indication of the number of parking spaces that are occupied and/or unoccupied. For example, parking status listing 400' may include a parking availability number 404 indicative of a number of occupied spaces 204 in each corresponding parking section 206. In some embodiments, parking status listing 400' may include an indication of the number of parking spaces in a given section. For example, parking status listing 400' may include a parking space count 406 indicative of a total number of spaces 204 in each corresponding parking section 206. In some embodiments, parking status listing 400' may include an indication of entrances that are associated with a corresponding parking section. For example, parking status listing 400' may specify one or more entrances 408 that are associated with a corresponding parking section 406.

In some embodiments, as parking status updates are received, parking status listing 400' may be updated to reflect the respective changes in parking status. FIG. 4B illustrates parking status listing 400" that has been updated to reflect recent changes in parking status in accordance with one or more embodiments of the present technique. In some embodiments, updated parking status listing 400" may be indicative of updated parking availability of the four parking sections 206*a*-106*d* (e.g., corresponding to respective section identifiers "1"-"4") of parking facility 200 at or near a second point in time that occurs after the first point in time. For example, where parking status updates 300 indicative of changes in parking status have been received between the first and second times, parking status listing 400' may include an updated version of parking status listing 400', modified to reflect the changes in parking status. In some embodiments, parking status listing 400" may correspond to an updated version of parking status listing 301 at or near the second point in time. Notably, parking section "3" (e.g., parking section 206*c*) is determined to have the highest level of parking availability relative to all of the others of the parking sections at the first point in time (as indicated by parking status listing 400'), and parking section "1" (e.g., parking section 206*a*) is determined to have the highest level of parking availability relative to all of the others of the parking sections at the second point in time (as indicated by parking status listing 400").

In some embodiments, parking server 104 may provide updated parking status information 302 to map server 102. In some embodiments, updated parking status information 302 may include parking status listings, parking status updates or related parking information. For example, parking server 104 may transmit, to map server 102, parking information 302 including current/updated versions of parking status listing 301, parking status updates 300, and/or updated information corresponding thereto such that map server 102 may maintain or generate a set of data corresponding to parking availability of parking facility 200.

Parking server 104 may continually provide updated parking information 302 reflective of updates to parking status listing 301 and/or additional parking status updates 300 received. In some embodiments, parking sever 104 may forward updated parking status information 302 on a substantially regular basis such that map server 102 may maintain a current/updated parking status listing 303 that is the same or substantially the same as parking status listing 301. In some embodiments, parking server 104 may forward updated parking status information 302 on a periodic basis. For example, parking server 104 may forward updated parking status information 302 to map server 102 about every one second, five seconds, thirty seconds, one minute, two minutes, five minutes, ten minutes, or any suitable frequency. In some embodiments, parking server 104 may forward, to map server 102, updated parking status information 302 in response to one or more changes in parking status. For example, upon detecting that the status of one or more parking spaces has changed and/or that a percentage of available parking space has changed, parking status information 302 including updated parking status listing 301 reflective of the changes, parking status updates 300 reflective of the changes and/or related parking information may be forwarded to map server 102.

In some embodiments, updated parking status information may be sent automatically, without being requested. For example, parking server 104 may push updated parking status information 302 to map server 102. In some embodiments, updated parking status information may be sent in response to requests for updated parking status information. For example, parking server 104 may transmit a current/updated version of parking status listing 301 and/or parking status updates 300 to map server 102 in response to receiving one or more corresponding requests for parking information from map server 102.

In some embodiments, parking status listing 303 may be indicative of parking availability some or all of parking facility 200. In some embodiments, parking status listing 303 may be generated and/or updated based on parking information 302 received from parking server 104 and/or other parking information received (e.g., parking status updates received from access devices as described herein). For example, upon receiving parking information 302 indicative of a change in parking status of one or more parking spaces, map server 102 may update parking status listing 303 to reflect the change in parking status. Accordingly, parking status listings 301 and 303 may be substantially the same as they both may be continually updated to reflect changes in parking status. In some embodiments, a version of parking status listing 303 at or near the first point in time may be the same or similar to parking status listing 400' of FIG. 4A and/or a current/updated version of parking status listing 303 at or near the second point in time may be the same or similar to parking status listing 400" of FIG. 4B. In some embodiments, map server 102 may store parking status listing 303 in datastore 132 or a similarly accessible storage location. As described herein, a current/updated version of parking status listing 303 may be employed by map server 102 to determine levels of parking availability within parking facility 200. In some embodiments, map server 102 maintaining a local version of parking status listing may reduce network traffic as map server may employ the local version of parking status listing to respond to parking status queries regarding parking availability at the corresponding parking facility and, thus, may not have to query parking server 104 for parking availability information.

In some embodiments, map server 102 may receive a request 304 relating to travel to a given destination. For example, user 112 may initiate, via access device 106, a given request 304 for navigational assistance to a destination (e.g., geographic place of interest 202 such as a shopping mall) and/or a request for parking availability information at the destination. Request 304 may be forwarded to map server 102 from access device 106.

Map server 102 may process the request to identify parking availability information relating to destination 202 and/or may provide navigational assistance to destination 202 based on the parking availability information. In some embodiments, embodiments, parking server 102 may identify parking facility 200 located at or near destination 202 and may retrieve parking availability information corresponding thereto. For example, parking server 102 may retrieve a current version of parking status listing 303 at or near the time of request 304. In some embodiments, map server 102 may process parking status listing 303 to identify a section 206 of parking facility 200 that is determined to have the most suitable parking availability. In some embodiments, a parking section may be determined to have the most suitable parking if it has the most suitable parking availability (e.g., the highest level of available parking) at or near the time of request 304. For example, where request 304 is submitted at or near the first point in time and the current version of parking status listing 303 at or near the time of request 304 is the same or similar to parking status listing 401' of FIG. 4A, parking section “3” (e.g., parking section 206_c_) may be determined to be the most suitable parking section based on parking section “3” having a level of parking availability (e.g., 57% parking availability percentage and/or twenty-six unoccupied spaces) that exceeds all of the other sections 206 of parking facility 200.

In some embodiments, a parking section may be determined to have the most suitable parking if it is forecast/predicted that the parking section will have the most suitable parking availability (e.g., the highest level of available parking) at or near the time of user 112 arriving at the parking facility. In some embodiments, map server 102 may compute a time of arrival at parking facility 200 based on an estimated time for the user/vehicle/access device 106 to navigate from its current geographic location to parking facility 200. In some embodiments, a current geographic location of a user/vehicle/access device may be provided via request 304 and/or other location information provided by access device 106 or other sources. For example, access device 106 may determine its geographic location via an integrated global positioning system (GPS) device, via assessing its location relative to nearby network access points (e.g., cell phone towers, Wi-Fi access points or the like) and/or similar locating techniques, and may forward the location information to map server 102. Map server 102 may estimate a time for the arrival of user 112 at parking facility 200 based on the determined geographic location of access device 106 and may generate forecasted parking availability at the estimated time of arrival based on historical parking availability information and/or current parking availability information (e.g., a current version of parking status listing 303 at or near the time of request 304) to identify a given parking section 206 that is predicted to have the most suitable parking availability (e.g., the highest level of available parking) at or near the estimated time of user 112 arriving at parking facility 200.

In certain embodiments, map server 102 may identify one or more entrances 210 of parking facility 200 that are associated with the identified section of the parking facility. For example, where parking section “3” is identified as the parking section having (or expected to have) the most suitable parking availability, map server 102 may identify a corresponding entrance 210 of parking facility 200 that provides convenient access to section “3”.

In some embodiments, identifying a corresponding entrance may include identifying an entrance that provides direct access to the identified parking section and/or a most efficient route for entering the parking section and, in the event no entrances provide direct access to the identified parking section, identifying one or more of the closest entrances that provide indirect access to the identified parking section. For example, with regard to parking facility of FIG. 2, where section “3” (e.g., parking section 206_c_) is identified as having (or expected to have) the most suitable parking availability, map server 102 may identify entrances 210_d_ and 210_e_ as candidate entrances based on entrances “E4” and “E5” being listed as corresponding to parking section “3” parking facility 200 (see parking availability listing 400'). Where map server 102 determines that a user is likely to approach parking facility 200 from the west (e.g., from left-side of the illustration of parking facility 200) map server 102 may determine that entrance “E4” (e.g., entrance 210*d*) provides the most efficient route for entering parking facility based on providing the shortest distance from the users current location to the parking section 206*c* and, thus, may identify entrance 210*d* as the selected entrance. Where map server 102 determines that a user is likely to approach parking facility 200 from the east (e.g., from right-side of the illustration of parking facility 200) map server 102 may determine that entrance “E5” (e.g., entrance 210*e*) may provide the most efficient route based on providing the shortest distance from the users current location to the parking section 206*c* and, thus, may identify entrance 210*e* as the selected entrance. In some embodiments, the most efficient route may be determined based on any suitable factors such as distance, traffic conditions, complexity of the route (e.g., number of turns, crossing traffic, and so forth), route preferences provided by the user, and so forth. As a further example, with regard to parking facility of FIG. 2, where section “4” (e.g., parking section 206*d*) is identified as having (or being expected to have) the most suitable parking availability, map server 102 may identify entrance “E5” as the selected entrance based on entrance “E5” being listed as the only entrance corresponding to parking section “4” parking facility 200.

In some embodiments, map server 102 may calculate a route to direct a user from a given location to the selected entrance of the parking facility. For example, where entrance “E4” (e.g., entrance 210*d*) has been selected, map server 102 may calculate a route from a current location of user 112 and/or access device 106 to entrance “E4”. In some embodiments, map server 102 may generate corresponding navigational information 306 to be provided for presentation to user 112. Navigational information 306 may provide route information or similar navigational assistance for directing user 112 to a selected entrance. For example, map server 102 may generate a geographic map or similar content (e.g., a listing of turn-by-turn directions, audible instructions and/or the like) that provides for directing user 112 to selected entrance “E4” via a given route.

In some embodiments, map server 102 may serve navigational information 306 for presentation to user 112. For example, navigational information 306 may include map data that is rendered by access device 106 to generate a graphical display of a geographic map that provides a route for directing user 112 to selected entrance “E4”. Navigational information 306 may include turn-by-turn direction data that provide a route for directing user 112 to selected entrance “E4”. The turn-by-turn directions data may be rendered for display to user 112 via a graphical user interface of access deice 106. In some embodiments, the turn-by-turn direction data may be presented in an audible format. For example, the turn-by-turn directions may be announced via a speaker of access device 106 to direct user 112 to selected entrance “E4”.

Navigational assistance may be provided via a substantially continuous exchange of information between access device 106 and map server 102. For example, as the user navigates, route information may be updated as necessary to direct the user to the currently selected entrance. For example, if a user navigates off course from of the provided route, access device 106 may provide an indication of the location of access device 106, and map server 102 may calculate and/or provide corrective navigational assistance. For example, where a user makes an incorrect turn, taking them off of the provided route, map server 102 may provide a corrective route for returning the user to the initial route and/or for directing the user to the selected entrance “E4”. In some embodiments, navigational assistance may include providing a dynamically updated display indicative of a current location of the user and/or access device 106. For example, an icon may be provided on a displayed mapping that is indicative of a current geographic location of the user 112 and/or access device 106. In some embodiments, navigational assistance may include providing a display indicative of a route for directing the user to the selected entrance. For example, a route from at least the current location of user 112 and/or access device 106 may be overlaid on a displayed mapping.

Figure 5A:
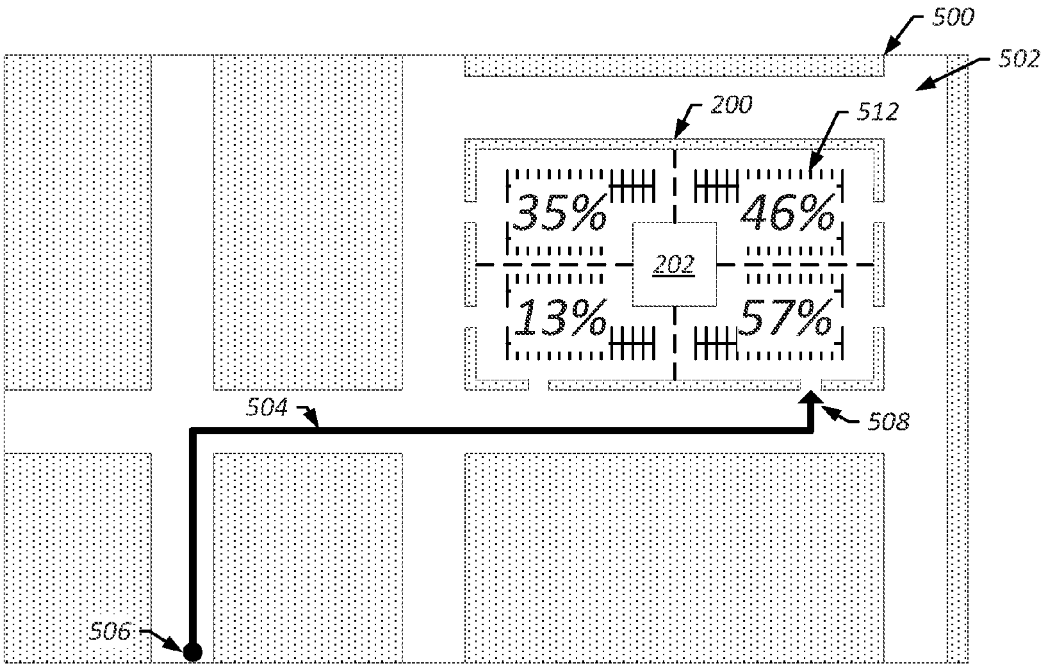
FIGS. 5A and 5B are illustrations of exemplary graphical displays of navigational mappings in accordance with one or more embodiments of the present technique.

FIG. 5A is an illustration of an exemplary graphical display of navigational mapping 500 in accordance with one or more embodiments of the present technique. Navigational mapping 500 may include a geographical map 502 of a given region including geographic place of interest 202 and parking facility 200. Navigational mapping 500 may include a mapping corresponding to navigational information 306. For example, some or all of navigational mapping 500 may be displayed as a result of rendering navigational information (e.g., map data) 306 served by map server 102 for display via a graphical display of access device 106. Navigational mapping 500 may include a navigational route 504 for directing a user to a selected entrance. Navigational route 504 may include an icon at a start/current location 506 indicative of a location of user 112 and/or access device 106 at or near the time of request 304, an end/destination location 508 that corresponds to the location of the currently selected entrance “E4” (e.g., entrance 210*d*).

In some embodiments, navigational mapping may provide an indication of level of parking availability. For example, mapping 500 may include parking availability indicators 512 overlaying the respective representations of parking sections 106. In some embodiments, parking availability indicators 512 may include a percentage and/or number of occupied/unoccupied parking spaces of the given parking section. For example, in the illustrated embodiment, parking availability indicators 512 may include a percentage that corresponds to parking availability percentages 402 of parking status listing 400' corresponding to a first point in time. In some embodiments, a parking availability indicator may include a color overlay that is indicative of a level of parking availability. For example, representations of parking sections having a parking availability percentage that is above 50% may be overlaid with a green color, representations of parking sections having a parking availability percentage that is between 50% and 5% may be overlaid with a yellow color, and representations of parking sections having a parking availability percentage that is at or below 5% may be overlaid with a red color.

In some embodiments, map server 102 may continuously monitor the parking availability of sections 206 of parking facility 200 to determine whether the currently selected parking section continues to have the most suitable parking availability relative to the other parking sections 206 of parking facility 200. For example, map server 102 may continuously monitor the parking availability of sections 206 of parking facility 200 to determine whether parking section “3” (e.g., parking section 206*c*) continues to have the most suitable parking availability relative to the other parking sections 206*a*, 206*b* and 206*d* of parking facility 200.

In some embodiments, continuously monitoring the parking availability of sections 206 of parking facility 200 may include comparing the parking availability of sections 206 of parking facility 200 on a substantially regular basis. In some embodiments, continuously monitoring the parking availability of sections 206 of parking facility 200 may include comparing the parking availability of sections 206 of parking facility 200 on a periodic basis. For example, map server 102 run a comparison of the parking availability of sections 206 of parking facility 200 about every one second, five seconds, thirty seconds, one minute, two minutes five minutes, ten minutes, or any suitable frequency. In some embodiments, continuously monitoring the parking availability of sections 206 of parking facility 200 may include comparing the parking availability of sections 206 of parking facility 200 upon receipt of updated parking status information and/or one or more changes in parking availability. For example, upon receiving updated parking status information 302 indicative of a change in parking status, parking status listing 303 may be updated accordingly to reflect any changes in parking level availability, and, in response to updates to parking status listing 303, a comparison may be run to determine which of the compared parking sections 206 currently has or is expected to have the most suitable parking availability relative to the other parking sections 206 of parking facility 200. For example, a comparison may be run when a parking status listing 303 changes from that of parking status listing 400' of FIG. 4A to that of parking status listing 400" of FIG. 4B based on received parking status information 302.

In some embodiments, running a comparison may include determining individual levels of parking availabilities of sections 206 of parking facility 200 based on a current version of the parking availability listing 303 and/or comparing the current levels of availability to one another to determine which of the compared parking sections 206 has or is expected to have the most suitable parking availability relative to the other parking sections 206 of parking facility 200. For example, parking server 102 may retrieve a current/updated version of parking status listing 303 at or shortly after the time of receiving parking status information 306 corresponding thereto. In some embodiments, map server 102 may process parking status listing 303 to identify a section of that parking facility that is determined to have or being expected to have the most suitable parking availability. For example, map server 102 may compare the parking availability percentage 402 and/or the number of occupied/unoccupied parking spaces 404 of parking sections "1"-"4" to determine which of the parking sections 206 currently has the most suitable parking availability at or near the time of the comparison and/or is predicted to have the most suitable parking availability at or near the estimated time of user 112 arriving at the parking facility 200.

In some embodiments, where it is determined that the selected parking section continues to have and/or is expected to have the most suitable parking availability relative to the other parking sections of the parking facility, navigational assistance to the first entrance may continue to be provided. For example, where it is determined that parking section "3" (e.g., parking section 206*c*) continues to have and/or is expected to have the most suitable parking availability, navigational assistance to parking section "3" (e.g., a navigational mapping to section "3" as discussed with regard to at least FIG. 5A) may continue to be provided.

In some embodiments, map server 102 may run a comparison of parking availability based on a current version of parking status listing 303 that is the same or similar to parking status listing 400" of FIG. 4B corresponding to a second point in time. As a result of the comparison, it may be determined that parking section "1" (e.g., parking section 206*a*) has and/or is expected to have the most suitable parking availability based on parking section "1" having a level of parking availability (e.g., 45% parking availability percentage and/or twenty-one unoccupied spaces) that exceeds all of the other sections 206 of parking facility 200.

In some embodiments, where it is determined that another section (e.g., a second section of the parking facility) has and/or is expected to have the most suitable parking (e.g., that the first section no longer has and/or is expected to have the most suitable parking availability relative to the other parking sections of the parking facility), map server 102 may identify/select a second entrance of the parking facility that is associated with the second section of the parking facility currently having and/or being expected to have the most suitable parking availability, and may provide navigational assistance to the second entrance identified/selected. For example, where it is determined that parking section "1" (e.g., parking section 206*a*) has and/or is expected to have the most suitable parking, map server 102 may identify/select entrance "E1" (e.g., entrance 210*a*) corresponding to parking section "1", and may provide navigational assistance to entrance "E1". In some embodiments, map server 102 may provide for dynamically updating the route displayed on a geographic mapping to direct user 112 from a given location (e.g., the current location of access device 106) to entrance "E1" (e.g., entrance 210*a*) of parking facility 200.

Figure 5B:
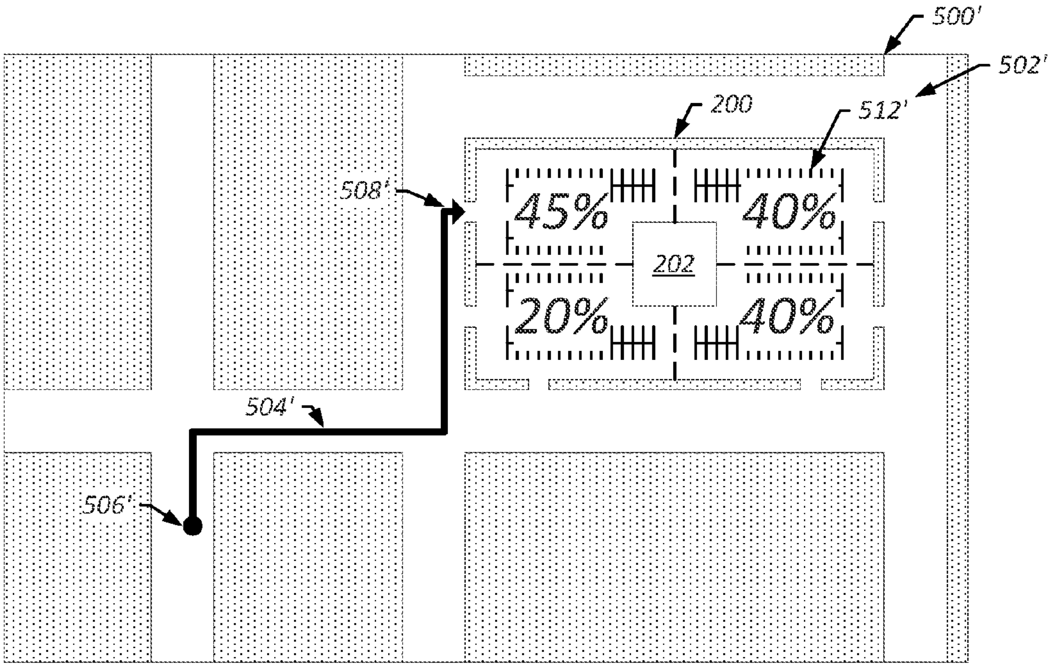

In some embodiments, map server 102 may provide updated navigational information 306' for presentation to user 112. In some embodiments, updated navigational information 306' may include updated geographic map data to be rendered by access device 106 to generate a graphical display of an updated geographic map that provides a route for directing user 112 to currently selected entrance "E1" (e.g., entrance 210*a*). FIG. 5B is an illustration of an exemplary graphical display of an updated navigational mapping 500' in accordance with one or more embodiments of the present technique. Navigational mapping 500' may include a mapping 502' corresponding to updated navigational information 306'. Navigational mapping 500' may include an updated navigational route 504' for directing user 112 to the currently selected entrance. Navigational route 504' may include an icon at a start/current location 506' indicative of a current location of user 112 and/or access device 106, an end/destination location 508' that corresponds to the location of the currently selected entrance "E1" (e.g., entrance 210*a*).

In some embodiments, parking indications 308 indicative of a status of one or more parking spaces may be provided to map server 102. In some embodiments, upon a vehicle being parked in a parking space 204 of a given parking section 206, a parking indication 308 may be provided to map server 102. For example, upon user 112 parking their vehicle in a parking space 204 of parking space set 208*a* of parking section 206*a*, a corresponding parking indication 308 may be provided to map server 102. In some embodiments, parking indication 308 may be indicative of a parking space 204, a parking space set 208 and/or a parking section 206. For example, parking indication 308 may specify that a parking space 204, of parking space set 208*a* and/or parking section 206*a* is occupied. In some embodiments, map server 102 may update the current version of parking status listing 303 to reflect the change in parking availability. In some embodiments, map server 102 may forward corresponding parking information 310 to parking server 104. Parking server 104 may update its current version of parking status listing 301 to reflect the change in parking availability. Accordingly, current versions of parking status listings 301 and 303 may remain substantially synchronized or otherwise consistent with one another based on the exchange of parking information 302 and/or 310.

In some embodiments, a parking indication 308 may be automatically transmitted based on detection of a user's vehicle being parked in a parking space. For example, upon access device 106 detecting that user 112 and/or their vehicle is parked in parking section 206*a* and/or has otherwise not moved from parking section 206*a* for an extended period of time, user access device 106 may forward a parking indication 308 indicative of a parking space 204 of parking section 206*a* being occupied. In some embodiments, a parking indication 308 may be initiated by a user. For example, upon parking in a parking space 204 of parking section 206*a*, user 112 may submit a corresponding parking indication 308 via user access device 106. In some embodiments, map server 102 may receive parking indications 308 from other sources. For example, other parking indications 308 may be received from other devices that are indicative of other users parking their vehicles in parking spaces 204 of parking facility 200.

In some embodiments, a parking indication 308 may be received that is indicative of a parking space being unoccupied. For example, upon user access device 106 detecting that user 112 and/or their vehicle is exiting a parking space 204 and/or parking section 206*a*, user access device 106 may forward a parking indication 308 indicative of a parking space 204 of parking section 206*a* being unoccupied. In some embodiments, a parking indication 308 may be initiated by a user. For example, upon exiting a parking space 204 of parking section 206*a*, user 112 may submit a corresponding parking indication 308 via user access device 106. In some embodiments, map server 102 may receive parking indications 308 from other sources. For example, other parking indications 308 may be received from other devices that are indicative of other users leaving parking spaces 204 of parking facility 200.

Figure 6:
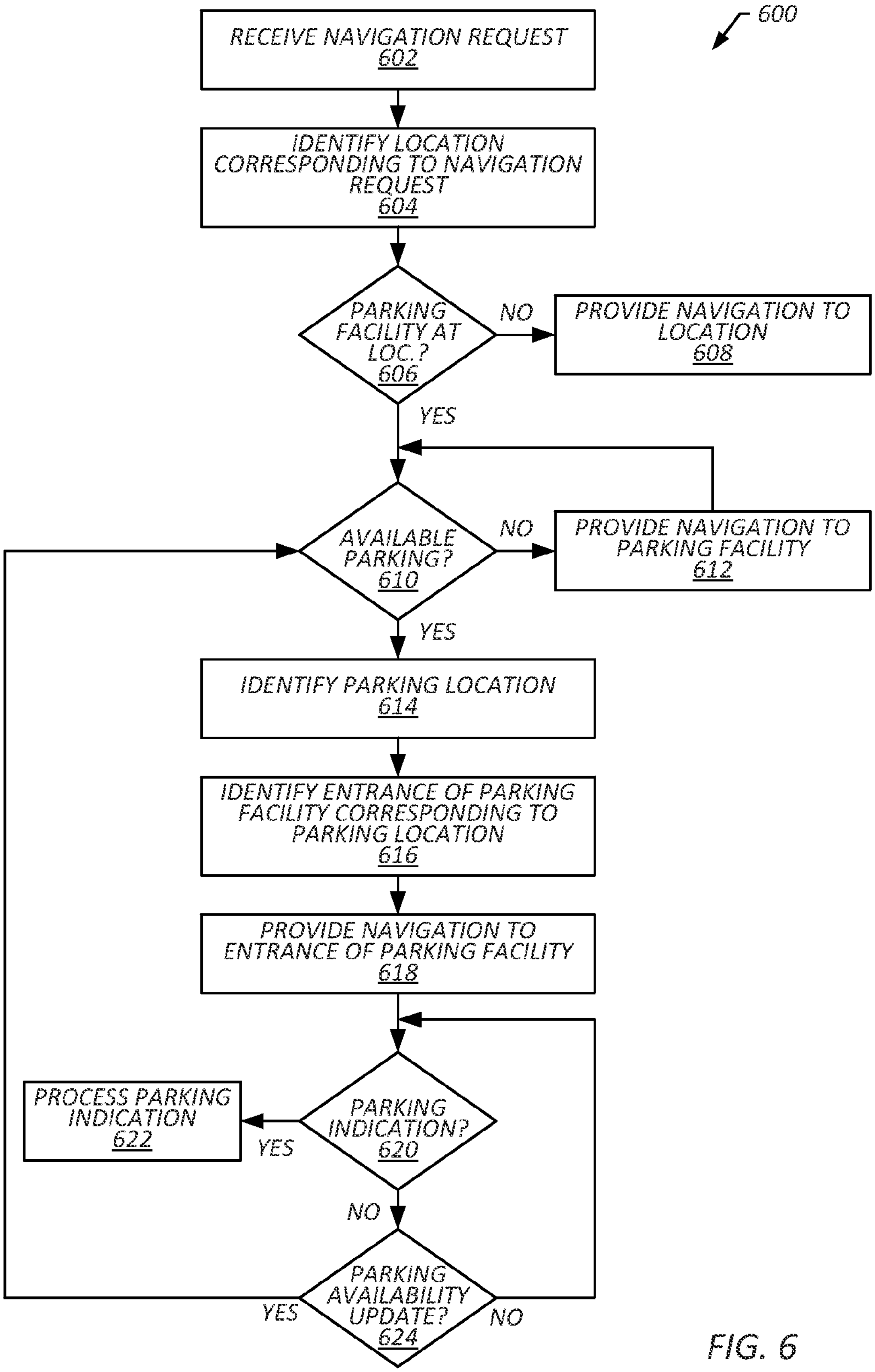
FIG. 6 is a flowchart that illustrates a method of providing parking assistance in accordance with one or more embodiments of the present technique.

FIG. 6 is a flowchart that illustrates a method 600 of providing parking assistance in accordance with one or more embodiments of the present technique. Method 600 may include receiving a navigation request, as depicted at block 602. In some embodiments, receiving a navigation request may include map server 102 receiving a request for navigational assistance to a given location/destination. For example, receiving a navigation request may include map server 102 receiving, from access device 106, request 304 for navigational assistance to destination 202 (e.g., a shopping mall).

Method 600 may include identifying a location corresponding to the navigation request, as depicted at block 604. In some embodiments, identifying a location corresponding to the navigation request may include map server 102 identifying a geographic location corresponding to a location of destination 202. For example, map server 102 may identify geographic coordinates and/or a geometric boundary corresponding to destination 202 (e.g., the shopping mall).

Method 600 may include determining whether or not a parking facility is located at or near the given location, as depicted at block 606. In some embodiments, determining whether or not a parking facility is located at or near the given location identified may include map server 102 determining whether or not a parking facility is located with a given distance (e.g., a one kilometer radius) of the given location of destination 202, is located within a geometric boundary of the given location of destination 202, and/or is otherwise associated with the identified location of destination 202 (e.g., the shopping mall parking lot associated with the shopping mall).

In some embodiments, where it is determined that a parking facility is not located at or near a given location associated with the request, method 600 may include providing navigational assistance to the location. For example, where user 112 has requested navigational assistance to a movie theatre located in a shopping mall and map server 102 has not identified a parking facility near the shopping mall, map server 102 may provide, to access device 106, navigational assistance to an entrance of the shopping mall that is nearest the movie theater.

In some embodiments, where it is determined that a parking facility is located at or near the given location, method 600 may include determining whether or not parking is available at the parking facility. For example, where is determined that parking facility 200 is associated with the location of destination 202, map server 102 may access a current version of parking status listing 303 to determine whether or not parking is currently available and/or is predicted to be available at or near the estimated time of arrival of user 112 and/or their vehicle at parking facility 200.

Upon determining that parking is not available, method 600 may include providing navigational assistance to the identified parking facility, as depicted at block 612. For example, upon map server 102 determining that parking is not currently available and/or predicted to not be available at parking facility 200, map server 102 may provide navigational information 306 including navigational assistance to parking facility 200 and/or a corresponding indication of the lack of parking availability to user access device 106 for presentation (e.g., display) to user 112. Accordingly, user 112 may continue to navigate to parking facility 200 based on the navigational assistance provided, all the while hoping that a parking will become available at or before the time of their arrival at parking facility 200.

In some embodiments, method 600 may include continuing to monitor the status of available parking as indicated by the arrow extending from block 612 to just above block 610. Accordingly, in some embodiments, system 100 may continually monitor parking availability and alert user 112 when parking becomes available, as discussed below. For example, upon receiving an indication that parking is not available at parking facility, user 112 may request to proceed to parking facility 200, map server 102 may provide navigational assistance to parking facility 200, map server 102 may continually monitor parking availability at parking facility 200, and, as described in more detail below, if map server 102 determines that parking is and/or is expected to be available at parking facility 200, map server 102 may alert user 112 to the available parking and/or provide navigational assistance to an entrance of parking facility 200 that corresponds to the location of the available parking.

In some embodiments, providing navigational assistance to a parking facility may include providing navigational assistance to an alternative parking facility. In some embodiments, upon determining that parking is not available at parking facility 200, method 600 may include attempting to identify and/or providing navigational assistance to an alternate parking facility that includes available parking. For example, upon map server 102 determining that parking is not currently available or is predicted to not be available at parking facility 200, map server 102 may provide navigational information 306 including navigational assistance to a parking facility other than parking facility 200 to user access device 106 for presentation (e.g., display) to user 112.

In some embodiments, navigational assistance to parking facility 200 may include navigational assistance to direct user 112 to anyone of the entrances of parking facility 200 and/or the location of destination 202 (e.g., the shopping mall) in a manner similar to that described at block 608. In some embodiments, it may be determined that parking is not available when the parking availability of all of the sections is about 0%. In some embodiments, it may be determined that parking is not available when the parking availability falls below a parking availability threshold (e.g., a given percentage or number of spaces). For example, it may be determined that parking is not available when the parking availability of all of the sections is below about 1% or they each have less than about two spaces unoccupied.

Upon determining that parking is available, method 600 may include identifying a parking location, as depicted at block 614. In some embodiments, identifying a parking location may include map server 102 identifying parking section 206 of parking facility 200 that has the most suitable parking availability and/or is predicted to have the most suitable parking availability at or near the estimated time of arrival of user 112 and/or their vehicle at parking facility 200. For example, map server 102 may assess a current version of parking status listing 303 (e.g., similar to parking status listing 400' of FIG. 4A) and identify parking section "3" (e.g., parking section 206*c*) of parking facility 200 as having and/or being expected to have the most suitable parking availability as discussed above.

Method 600 may include identifying an entrance corresponding to the identified parking location, as depicted at block 616. In some embodiments, identifying an entrance may include map server 102 identifying an entrance 210 of parking facility 200 that provides convenient access to a section 210 of the parking facility identified as having or being expected to have the most suitable parking availability. For example, map server 102 may identify entrance "E4" (e.g., entrance 210*d*) as corresponding to parking section "3" (e.g., parking section 206*c*) of parking facility 200 as discussed above.

Method 600 may include providing navigational assistance to the entrance of the parking facility identified, as depicted at block 618. In some embodiments, providing navigational assistance to the entrance of the parking facility identified may include map server 102 providing navigational assistance to direct user 112 to entrance "E4" (e.g., entrance 210*d*) of parking facility 200. For example, map server 102 may provide navigational information 306 for providing a navigational mapping 500 (see FIG. 5A) directing user 112 to entrance "E4" (e.g., entrance 210*d*) as discussed above.

Method 600 may include determining whether a parking indication indicative of the vehicle being parked and/or navigation being cancelled has been received, as depicted at block 620. In some embodiments, upon receiving a parking indication 308 and/or a request to cancel navigational assistance, method 600 may include processing the indication/request as depicted at block 622. For example, upon receiving a parking indication 308 indicative of user 112 parking their vehicle in a parking space of parking facility 200, map server 102 may update parking status listing 303 and/or forward corresponding parking information 310 to parking server 104 as discussed herein. Upon receiving a request to cancel navigational assistance, parking server 102 may refrain from providing additional navigational assistance information 306 to access device 106 and/or may update parking availability forecast accordingly (e.g., to reflect user 112 no longer being expected to park their vehicle at parking facility 200).

In some embodiments, where it is determined that the vehicle has not yet been parked and/or navigation has not been cancelled, method 600 may include determining whether there have been any updates/changes to parking availability, as depicted at block 624. It may be determined that the vehicle has not yet been parked when no indication has been provided that the user and/or their vehicle has arrived at the entrance of the parking facility (e.g., the user 112 is still in the process of navigating to the entrance of the parking facility). In some embodiments, determining whether there have been any updates/changes to parking availability may include map server 102 determining whether there have been any changes to parking status listing 303 that are indicative of changes in parking availability. For example, map sever 102 may continuously monitor parking status listing 303 and/or parking status updates 302 to determine whether there have been any updates/changes to parking availability. In response to determining that an update/change has occurred, method 600 may include reassessing the availability of parking and providing navigational assistance corresponding thereto.

Upon an update/change in parking availability occurring that results in a determination that parking is no longer available, method 600 may include providing navigational assistance to the parking facility, as discussed with regard to block 612. For example, map server 102 may provide updated navigational information 306' including navigational assistance to parking facility 200 and/or a corresponding indication of the lack of parking availability to user access device 106 for presentation (e.g., display) to user 112. Accordingly, a user may be informed that parking availability has diminished during their navigation to parking facility. Thus, a user may be afforded an opportunity to decide whether or not to continue traveling to the destination, thus, potentially avoiding the situation where the user navigates completely to the parking facility only to find, unbeknownst to the user, that no parking is available at the parking facility.

In some embodiments, where it is determined that the selected parking section continues to have the most suitable parking availability relative to the other parking sections of the parking facility, method 600 may include continuing to provided navigational assistance to a corresponding entrance. For example, where it is determined that parking section "3" (e.g., parking section 206*c*) continues to have the most suitable parking availability, navigational assistance to parking section "3" (e.g., a navigational mapping to section "3" as discussed with regard to at least FIG. 5A) may continue to be provided.

In some embodiments, where it is determined that that another section (e.g., a second section of the parking facility) has and/or is expected to have the most suitable parking (e.g., that the first section no longer has and/or is not expected to have the most suitable parking availability relative to the other parking sections of the parking facility), method 600 may include providing updated navigational assistance to another entrance corresponding to a section determined to have and/or expected to have the most suitable parking availability. For example, where it is subsequently determined that parking section "1" (e.g., parking section 206*a*) has the most suitable parking, map server 102 may identify/select entrance "E1" corresponding to parking section "1", and may provide updated navigation information 306' for providing navigational assistance to entrance "E1" (e.g., a navigational mapping to section "1" as discussed with regard to at least FIG. 5B). Accordingly, method 600 may provide for dynamically updating a route displayed on the geographic mapping to direct the user from a given location (e.g., the current location of user 112 and/or access device 106) to the entrance of the parking facility determined to have or being expected to have the most suitable parking availability.

Method 600 is an exemplary embodiment of a method employed in accordance with techniques described herein. Method 600 may be may be modified to facilitate variations of its implementations and uses. Method 600 may be implemented in software, hardware, or a combination thereof. Some or all of method 600 may be implemented by parking application 120, map module 130, parking module 140 and/or monitor module 150. The order of method 600 may be changed, and various elements may be added, reordered, combined, omitted, modified, etc.

Exemplary Computer System

Figure 7:
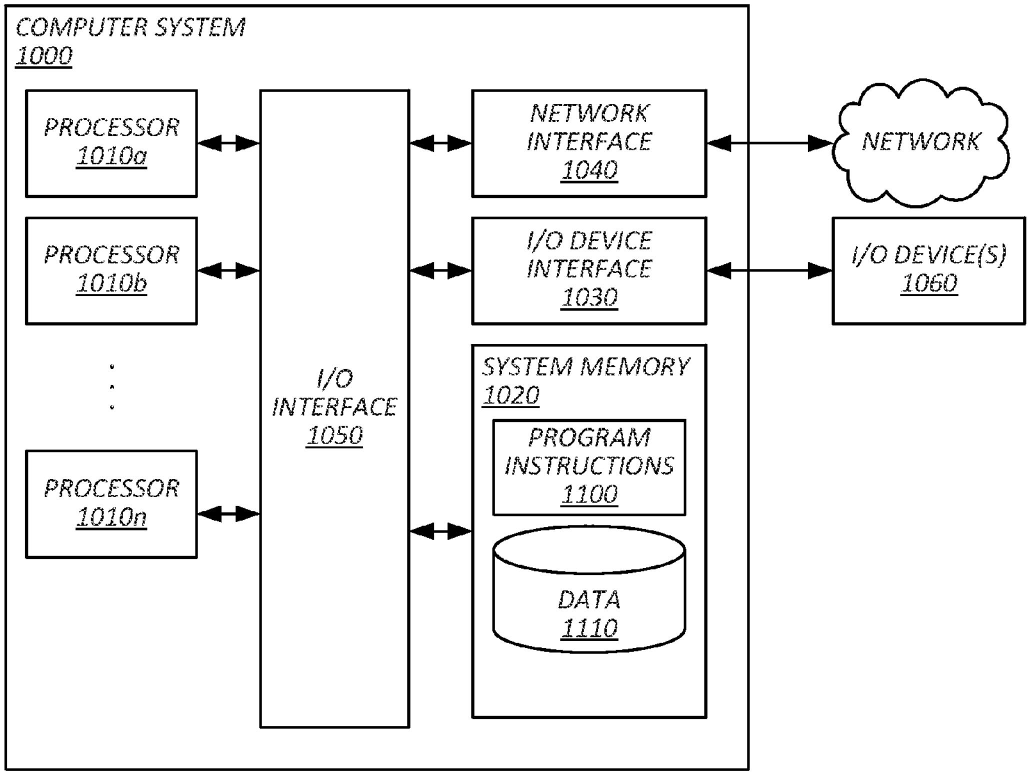
FIG. 7 is a diagram that illustrates an exemplary computer system in accordance with one or more embodiments of the present technique.

FIG. 7 is a diagram that illustrates an exemplary computer system 1000 in accordance with one or more embodiments of the present technique. Various portions of systems and methods described herein, may include or be executed on one or more computer systems similar to system 1000. For example, one or more entities of system 100 (e.g., map server 102, parking server 104, access device 106, and/or parking monitor 108) may include a configuration similar to at least a portion of computer system 1000. Further, methods/processes/modules described herein may be executed by one or more processing systems similar to that of computer system 1000.

Computer system 1000 may include one or more processors (e.g., processors 1010*a*-1010*n*) coupled to system memory 1020, an input/output I/O device interface 1030 and a network interface 1040 via an input/output (I/O) interface 1050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 1000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and/or data from a memory (e.g., system memory 1020). Computer system 1000 may be a uni-processor system including one processor (e.g., processor 1010*a*), or a multi-processor system including any number of suitable processors (e.g., 1010*a*-1010*n*). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry (e.g., an FPGA (field programmable gate array) or an ASIC (application specific integrated circuit)). Computer system 1000 may include a computer system employing a plurality of computer systems (e.g., distributed computer systems) to implement various processing functions.

I/O device interface 1030 may provide an interface for connection of one or more I/O devices 1060 to computer system 1000. I/O devices may include any device that provides for receiving input (e.g., from a user) and/or providing output (e.g., to a user). I/O devices 1060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 and/or data 1110. Program instructions 1100 may be executable by a processor (e.g., one or more of processors 1010*a*-1010*n*) to implement one or more embodiments of the present technique. Instructions 1100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier and/or a non-transitory computer readable storage medium having program instructions stored thereon. A tangible program carrier may include a propagated signal and/or a non-transitory computer readable storage medium. A propagated signal may include an artificially generated signal (e.g., a machine generated electrical, optical, or electromagnetic signal) having encoded information embedded therein. The propagated signal may be transmitted by a suitable transmitter device to and/or received by a suitable receiver device. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010*a*-1010*n*, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices and/or software that may perform or otherwise provide for the performance of the techniques described herein. For example, computer system 1000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Any headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method, comprising:

receiving, from a mobile communications device, a request for navigational assistance to a given location;

identifying a parking facility at or near the given location, the parking facility comprising a plurality of sections accessible by a plurality of different entrances to the parking facility, and each of the sections comprising a corresponding set of parking spaces;

identifying a first section of the parking facility associated with a level of parking availability that exceeds levels of parking availability of others of the plurality of sections of the parking facility;

identifying a first entrance of the parking facility that corresponds to the first section of the parking facility;

providing, to the mobile communications device for presentation to a user, navigational assistance to the first entrance of the parking facility; and prior to receiving an indication that a vehicle associated with the mobile communications device has arrived at the first entrance of the parking facility:

monitoring, using a computer, current availability of parking in the plurality of sections of the parking facility to determine whether the first section continues to be associated with a level of parking availability that exceeds levels of parking availability associated with the others of the plurality of sections of the parking facility;

determining that a second section of the parking facility is associated with a current level of parking availability that exceeds a current level of parking availability associated with the first section of the parking facility; and in response to determining that the second section of the parking facility is associated with a current level of parking availability that exceeds a current level of parking availability associated with the first section of the parking facility, providing, to the mobile communications device for presentation to the user, navigational assistance to a second entrance of the parking facility that corresponds to the second section of the parking facility.

2. The method of claim 1, wherein monitoring availability of parking in the plurality of sections of the parking facility to determine whether the first section continues to be associated with a level of parking availability that exceeds levels of parking availability associated with the others of the plurality of sections of the parking facility comprises continuously monitoring a parking status listing indicative of availability of parking spaces in the plurality of sections of the parking facility at the parking facility, and wherein the parking status listing is continuously updated based on parking status updates received from a remote parking management system.

3. The method of claim 2, wherein parking status updates are automatically received from the remote parking management system on a periodic basis.

4. The method of claim 2, further comprising:

receiving, from the remote parking management system, one or more parking status updates indicating a reduction in the level of parking availability of the first section of the parking facility or one or more parking status updates indicating an increase in the level of parking availability of the second section of the parking facility, wherein determining that a second section of the parking facility is associated with a current level of parking availability that exceeds a current level of parking availability associated with the first section of the parking facility is based at least in part on the one or more parking status updates received from the remote parking management system; and updating the parking status listing to reflect the level of parking availability of the first and second sections of the parking facility.

5. The method of claim 2, further comprising:

receiving, from the remote parking management system, one or more parking status updates indicating that one or more parking spaces of the first section of the parking facility previously unoccupied are now occupied or that one or more parking spaces of the second section of the parking facility previously occupied are now unoccupied, wherein determining that a second section of the parking facility is associated with a current level of parking availability that exceeds a current level of parking availability associated with the first section of the parking facility is based at least in part on the one or more parking status updates received from the remote parking management system; and updating the parking status listing to reflect the level of parking availability of the first and second sections of the parking facility.

6. The method of claim 2, further comprising:

determining that all of the plurality of sections of the parking facility are associated with a current level of parking availability that does not satisfy a parking availability threshold; and in response to determining that all of the sections of the parking facility are associated with a current level of parking availability that does not satisfy a parking availability threshold, providing, to the mobile communications device, an indication that all of the sections of the parking facility are associated with a current level of parking availability that does not satisfy a parking availability threshold.

7. The method of claim 1, further comprising providing, to the mobile communications device for presentation to the user, an indication of a current level of parking availability associated with a section of the parking facility corresponding to the entrance to which navigational assistance is currently being provided.

8. The method of claim 1, wherein parking availability associated with a given section of the parking facility is based at least in part on a number of the parking spaces of the given section that are unoccupied.

9. The method of claim 1, wherein identifying a first section of the parking facility associated with a level of parking availability that exceeds levels of parking availability associated with others of the plurality of sections of the parking facility comprises identifying a first section of the parking facility associated with the greatest number of available parking spaces.

10. The method of claim 1, wherein parking availability associated with a given section of the parking facility is based at least in part on a percentage of the parking spaces of the given section that are unoccupied.

11. The method of claim 1, wherein identifying a first section of the parking facility associated with a level of parking availability that exceeds levels of parking availability associated with others of the plurality of sections of the parking facility comprises identifying a first section of the parking facility associated with the highest ratio of available parking spaces to unavailable parking spaces.

12. The method of claim 1, wherein the first section of the parking facility corresponds to a plurality of entrances, and wherein identifying a first entrance of the parking facility that corresponds to the first section of the parking facility comprises identifying one of the plurality of entrances corresponding to the first section that corresponds to a most efficient route from a current location of the mobile communications device to the first section of the parking facility.

13. The method of claim 1, wherein the navigational assistance to the second entrance of the parking facility that corresponds to the second section of the parking facility is to be presented to the user in place of the navigational assistance to the first entrance of the parking facility that corresponds to the second section of the parking facility.

14. The method of claim 1, wherein the navigational assistance to the first and second entrances of the parking facility is to be visually displayed to the user via a graphical user interface of the mobile communications device.

15. The method of claim 1, wherein the navigational assistance to the first and second entrances of the parking facility is to be audibly presented to the user via a speaker of the mobile communications device.

16. The method of claim 1, wherein providing navigational assistance to the first entrance of the parking facility comprises providing a first mapping of a route to the first entrance of the parking facility, and wherein providing navigational assistance to the second entrance of the parking facility comprises providing a second mapping of a route to the second entrance of the parking facility.

17. The method of claim 1, wherein the mobile communications device comprises at least one or more of a cellular phone, a navigation device, or a portable computer device.

18. A non-transitory computer readable storage medium having computer-executable program instructions stored thereon, the program instructions executable by a computer to cause steps comprising:

receiving, from a mobile communications device, a request for navigational assistance to a given location;

identifying a parking facility at or near the given location, the parking facility comprising a plurality of sections accessible by a plurality of different entrances to the parking facility, and each of the sections comprising a corresponding set of parking spaces;

identifying a first section of the parking facility associated with a level of parking availability that exceeds levels of parking availability of others of the plurality of sections of the parking facility;

identifying a first entrance of the parking facility that corresponds to the first section of the parking facility;

providing, to the mobile communications device for presentation to a user, navigational assistance to the first entrance of the parking facility; and prior to receiving an indication that a vehicle associated with the mobile communications device has arrived at the first entrance of the parking facility:

monitoring, using a computer, current availability of parking in the plurality of sections of the parking facility to determine whether the first section continues to be associated with a level of parking availability that exceeds levels of parking availability associated with the others of the plurality of sections of the parking facility;

determining that a second section of the parking facility is associated with a current level of parking availability that exceeds a current level of parking availability associated with the first section of the parking facility; and in response to determining that the second section of the parking facility is associated with a current level of parking availability that exceeds a current level of parking availability associated with the first section of the parking facility, providing, to the mobile communications device for presentation to the user, navigational assistance to a second entrance of the parking facility that corresponds to the second section of the parking facility.

19. A system, comprising:

a processor;

a memory; and a map module stored on the memory, the map module configured to be executed by the processor to cause:

receiving, from a mobile communications device, a request for navigational assistance to a given location;

identifying a parking facility at or near the given location, the parking facility comprising a plurality of sections accessible by a plurality of different entrances to the parking facility, and each of the sections comprising a corresponding set of parking spaces;

identifying a first section of the parking facility associated with a level of parking availability that exceeds levels of parking availability of others of the plurality of sections of the parking facility;

identifying a first entrance of the parking facility that corresponds to the first section of the parking facility;

providing, to the mobile communications device for presentation to a user, navigational assistance to the first entrance of the parking facility; and prior to receiving an indication that a vehicle associated with the mobile communications device has arrived at the first entrance of the parking facility:

monitoring, using a computer, current availability of parking in the plurality of sections of the parking facility to determine whether the first section continues to be associated with a level of parking availability that exceeds levels of parking availability associated with the others of the plurality of sections of the parking facility;

determining that a second section of the parking facility is associated with a current level of parking availability that exceeds a current level of parking availability associated with the first section of the parking facility; and in response to determining that the second section of the parking facility is associated with a current level of parking availability that exceeds a current level of parking availability associated with the first section of the parking facility, providing, to the mobile communications device for presentation to the user, navigational assistance to a second entrance of the parking facility that corresponds to the second section of the parking facility.

20. A method for providing navigational assistance to a section of a parking facility determined to have the most suitable parking availability, the method comprising:

receiving, from a mobile communications device, a request for navigational assistance to a given location;

identifying a parking facility at or near the given location, the parking facility comprising a plurality of sections accessible by a plurality of different entrances to the parking facility, each of the sections comprising a plurality of parking spaces;

identifying a first section of the parking facility having a most suitable parking availability;

identifying an entrance of the parking facility that corresponds to the first section of the parking facility identified as having the most suitable parking availability;

providing, to the mobile communications device, navigational assistance to direct a vehicle to the entrance of the parking facility;

substantially continuously monitoring availability of parking in the plurality of sections of the parking facility to determine whether another section of the parking facility has parking availability that is more suitable than the section of the parking facility identified as having the most suitable parking availability; and in response to determining that another section of the parking facility has parking availability that is more suitable than the section of the parking facility identified as having the most suitable parking availability, rerouting the navigational assistance to direct a vehicle to an entrance of the parking facility that corresponds to the other section of the parking facility.

* * * * *